US012702879B2

(12) United States Patent
Wieczerzak

(10) Patent No.: US 12,702,879 B2
(45) Date of Patent: Aug. 11, 2026

(54) FIRE EXTINGUISHER VALVE BODY AND CYLINDER

(71) Applicant: Carrier Corporation, Palm Beach Gardens, FL (US)

(72) Inventor: Wieslaw Wieczerzak, Czermin (PL)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 507 days.

(21) Appl. No.: 18/160,119

(22) Filed: Jan. 26, 2023

(65) Prior Publication Data

US 2023/0241434 A1 Aug. 3, 2023

(30) Foreign Application Priority Data

Jan. 28, 2022 (EP) .................................... 22154086

(51) Int. Cl.

*A62C 13/70* (2006.01)
*A62C 13/66* (2006.01)
*A62C 13/76* (2006.01)
*A62C 99/00* (2010.01)

(52) U.S. Cl.

CPC .............. *A62C 13/70* (2013.01); *A62C 13/76* (2013.01); *A62C 99/009* (2013.01); *A62C 13/66* (2013.01); *F17C 2270/0754* (2013.01)

(58) Field of Classification Search

CPC ....... A62C 13/70; A62C 13/76; A62C 99/009; A62C 13/66; F17C 2270/0754; F17C 13/04

USPC ............................ 169/85; 222/399; 137/590

See application file for complete search history.

(56) References Cited

U.S. PATENT DOCUMENTS 2,021,241 A 11/1935 Mall
2,580,448 A * 1/1952 Mapes ................ A62C 13/003 222/394
2,620,038 A * 12/1952 Somers ................ A62C 13/006 169/85
2,796,135 A 6/1957 Nurkewicz
(Continued)

FOREIGN PATENT DOCUMENTS

AU 1978033250 A1 8/1979
CN 2683180 Y 3/2005
(Continued)

OTHER PUBLICATIONS

European Search Report for application EP 22154086.7, dated Jul. 7, 2022, 6 pages.
(Continued)

*Primary Examiner* — Kevin Edward Schwartz
(74) *Attorney, Agent, or Firm* — CANTOR COLBURN LLP

(57) ABSTRACT

A cartridge-operated fire extinguisher 100 that includes a valve body 104 and a cylinder 102. The valve body (104) includes three fixing points 300, 302, 304 each including an aperture 300*a*, 302*a*, 304*a* with a fixing point axis A, B, C. The third fixing point axis C is oriented at an angle relative to the first fixing point axis A and the second fixing point axis B. The cylinder includes three bolts 210, 212, 214 for fixing the valve body to the cylinder. Each bolt includes a shaft 210*a*, 212*a*, 214*a* with a shaft axis X, Y, Z. The first shaft axis X and the second shaft axis Y are parallel, and the third shaft axis Z is oriented at an angle relative to the first shaft axis X and the second shaft axis Y.

13 Claims, 6 Drawing Sheets

(56) References Cited

U.S. PATENT DOCUMENTS

| | | | | | |
|---|---|---|---|---|---|
| 2,962,307 | A | | 11/1960 | Nebinger | |
| 2,981,439 | A | | 4/1961 | Huffman | |
| 3,092,183 | A | | 6/1963 | Guise et al. | |
| 3,105,458 | A | | 10/1963 | Downham | |
| 3,273,610 | A | | 9/1966 | Frost | |
| 3,314,696 | A | | 4/1967 | Ferguson | |
| 3,330,527 | A | | 7/1967 | Ignatius | |
| 3,450,424 | A | | 6/1969 | Calsher | |
| 3,675,722 | A | | 7/1972 | Balmes, Sr. | |
| 3,777,789 | A | | 12/1973 | Corlet | |
| 3,858,659 | A | * | 1/1975 | Fukushima | A62C 13/70 169/88 |
| 3,998,274 | A | * | 12/1976 | Liautaud | A62C 13/62 169/89 |
| 4,815,541 | A | | 3/1989 | Arrington | |
| 4,923,350 | A | | 5/1990 | Hinksman et al. | |
| 5,000,614 | A | | 3/1991 | Walker et al. | |
| 5,513,882 | A | | 5/1996 | Lewis | |
| 5,586,792 | A | | 12/1996 | Kalahasthy et al. | |
| 6,006,956 | A | * | 12/1999 | Jorgensen | A62C 13/76 222/402.1 |
| 6,076,545 | A | * | 6/2000 | Cooper | A62C 35/68 200/81.9 R |
| 6,371,528 | B1 | | 4/2002 | Kimura | |
| 6,488,099 | B2 | | 12/2002 | McSheffrey et al. | |
| 7,150,478 | B2 | | 12/2006 | Poirer et al. | |
| 7,168,451 | B1 | | 1/2007 | Dundas | |
| 7,201,403 | B2 | | 4/2007 | Takayanagi et al. | |
| 7,364,207 | B2 | | 4/2008 | McGee et al. | |
| 7,387,140 | B2 | | 6/2008 | Brunn | |
| 7,387,318 | B2 | | 6/2008 | Yoshida | |
| 7,530,605 | B2 | | 5/2009 | Rigollet et al. | |
| 8,282,139 | B2 | | 10/2012 | Kerin et al. | |
| 8,973,952 | B2 | | 3/2015 | Nishino et al. | |
| 9,086,180 | B2 | | 7/2015 | Porta | |
| 9,995,420 | B1 | | 6/2018 | Topacio | |
| 10,010,732 | B2 | | 7/2018 | Hu et al. | |
| 10,105,562 | B2 | | 10/2018 | Arnette | |
| 10,113,676 | B2 | | 10/2018 | Bush et al. | |
| 10,844,988 | B2 | | 11/2020 | Simon et al. | |
| 10,926,119 | B1 | * | 2/2021 | Rousseau | A62C 13/74 |
| 2005/0067837 | A1 | | 3/2005 | Alexander et al. | |
| 2006/0131034 | A1 | | 6/2006 | Lahouati | |
| 2013/0186655 | A1 | | 7/2013 | Mauney | |
| 2015/0367154 | A1 | | 12/2015 | Rousseau et al. | |
| 2016/0287920 | A1 | | 10/2016 | Arnette | |
| 2023/0241435 | A1 | | 8/2023 | Wieczerzak | |
| 2023/0241436 | A1 | | 8/2023 | Wieczerzak | |
| 2023/0241437 | A1 | | 8/2023 | Wieczerzak | |

FOREIGN PATENT DOCUMENTS

| | | | |
|---|---|---|---|
| CN | 105435395 | A | 3/2016 |
| CN | 214286393 | U | 9/2021 |
| DE | 2450555 | A1 | 5/1976 |
| DE | 2620909 | A1 | 11/1977 |
| DE | 9409359 | U1 | 10/1994 |
| DE | 29719977 | U1 | 3/1998 |
| DE | 102010012215 | A1 | 2/2011 |
| DE | 102015003753 | A1 | 10/2015 |
| EP | 0773044 | A1 | 5/1997 |
| EP | 0965364 | A1 | 12/1999 |
| EP | 1175248 | A | 1/2002 |
| EP | 1393779 | A1 | 3/2004 |
| EP | 1368588 | B1 | 8/2005 |
| EP | 1695743 | A1 | 8/2006 |
| EP | 2002865 | A2 | 12/2008 |
| EP | 2159765 | A1 | 3/2010 |
| EP | 2277601 | A1 | 1/2011 |
| EP | 2335422 | B1 | 12/2013 |
| EP | 1812744 | B1 | 1/2014 |
| EP | 3659677 | A1 | 6/2020 |
| EP | 3660382 | A1 | 6/2020 |
| FR | 1039574 | A | 10/1953 |
| FR | 2784735 | A1 | 4/2000 |
| FR | 2866242 | A1 | 8/2005 |
| FR | 2965486 | A1 | 4/2012 |
| FR | 2985912 | A1 | 7/2013 |
| GB | 691262 | A | 5/1953 |
| GB | 854730 | A | 11/1960 |
| GB | 1566815 | A | 5/1980 |
| GB | 2076284 | A | 12/1981 |
| GB | 2084014 | A | 4/1982 |
| GB | 2387632 | B | 10/2003 |
| JP | 2010099272 | A | 5/2010 |
| WO | 2010035150 | A1 | 4/2010 |

OTHER PUBLICATIONS

European Search Report for application EP 22154064.4, Jul. 8, 2022, 6 pages.

European Search Report for Application No. 22154060.2; Issued Jul. 11, 2022; 7 Pages.

European Search Report for Application No. 22154079.2; Issued Jul. 4, 2022; 6 Pages.

* cited by examiner

FIRE EXTINGUISHER VALVE BODY AND CYLINDER

FOREIGN PRIORITY

This application claims priority to European Patent Application No. 22154086.7, filed Jan. 28, 2022, and all the benefits accruing therefrom under 35 U.S.C. § 119, the contents of which in its entirety are herein incorporated by reference.

BACKGROUND

The present disclosure relates to cartridge-operated fire extinguishers, particularly to a valve body and cylinder for a cartridge-operated fire extinguisher and a method of assembling the cartridge-operated fire extinguisher.

The regular inspection and maintenance of fire extinguishers is important to ensure that fire extinguishers remain operational and safe to use.

There are different types of fire extinguishers such as stored pressure fire extinguishers and cartridge-operated fire extinguishers.

Cartridge-operated fire extinguishers typically have a configuration in which a fire suppressant (e.g. water or dry powder) is stored in an unpressurised cylinder and a propellant is stored under pressure in a separate sealed cartridge within the cylinder. The top of the cylinder is sealed with a valve body. The valve body also holds the cartridge. Activation of a cartridge-operated fire extinguisher first requires piercing of the pressurised cartridge. Piercing of the pressurised cartridge releases the propellant into the unpressurised cylinder through the valve body and forces the fire suppressant out of the cylinder through the valve body and into a hose. The hose can then be aimed by a user at a fire to direct fire suppressant at the fire.

Cartridge-operated fire extinguishers are often used in industrial environments such as in construction and heavy equipment industries due to their heavy duty, robust design. However, the robust design of such fire extinguishers often means that cartridge-operated fire extinguishers are heavy.

The valve body assembly of a cartridge-operated fire extinguisher is typically designed such that it has a threaded connector and is attached to the cylinder of the fire extinguisher by being screwed in to a corresponding threaded opening of the cylinder. To remove the valve body for inspection and maintenance of the fire extinguisher, specialist tools are required. Further, there is a risk that, when the valve body is reattached to the cylinder, cross-threading can occur. This can mean that servicing of a cartridge-operated fire extinguisher can be complex or lengthy process and may result in human errors.

There is a desire to simplify the inspection and maintenance process of cartridge-operated fire extinguishers while maintaining appropriate safety standards.

SUMMARY

According to a first aspect, the present invention provides a valve body for a cartridge-operated fire extinguisher, the valve body comprising: a first fixing point comprising a first aperture for receiving a first shaft of a first bolt, wherein the first aperture has a first fixing point axis; a second fixing point comprising a second aperture for receiving a second shaft of a second bolt, wherein the second aperture has a second fixing point axis; and a third fixing point comprising a third aperture for receiving a third shaft of a third bolt, wherein the third aperture has a third fixing point axis, wherein the first fixing point axis and the second fixing point axis are parallel, and wherein the third fixing point axis is oriented at an angle relative to the first fixing point axis and the second fixing point axis.

The valve body may be for mounting on a cylinder for a cartridge-operated fire extinguisher. The cylinder may comprise the first, second, and third bolts. The cylinder for use with the valve body may be patentable in its own right.

Thus according to a second aspect, the present invention provides a cylinder for a cartridge-operated fire extinguisher, the cylinder comprising: a first bolt having a first shaft, wherein the first shaft comprises a first shaft axis; a second bolt having a second shaft, wherein the second shaft comprises a second shaft axis; and a third bolt having a third shaft, wherein the third shaft comprises a third shaft axis, wherein the first, second, and third bolts are for fixing a valve body to the cylinder, wherein the first shaft axis and the second shaft axis are parallel, and wherein the third shaft axis is oriented at an angle relative to the first shaft axis and the second shaft axis.

The valve body may be mounted on the cylinder to provide a cartridge-operated fire extinguisher. Thus the first, second and third bolts referred to in the first aspect may be the first, second and third bolts of the cylinder of the second aspect.

Thus, according to a third aspect, the present invention provides a cartridge-operated fire extinguisher comprising a valve body in accordance with the first aspect and a cylinder in accordance with the second aspect.

The following description may be applicable to one, or more or all of the first, second and third aspects of the invention as applicable.

A cartridge-operated fire extinguisher may comprise one or more of a cylinder, a valve body, a cartridge, a hose connector, a cartridge piercer, a hose, and/or a lever/handle. The valve body may be mounted to the top of the cylinder. The cylinder may house fire suppressant. The cartridge may contain a propellant stored under pressure. The cartridge may be housed within the cylinder. The cartridge piercer may be for piercing the cartridge to release the propellant contained therein. When the fire extinguisher is assembled the valve body may be connected to the cartridge. When the valve body is mounted on the cylinder the cartridge may be held within the cylinder by the valve body. The hose connector may be mounted on the valve body. The hose connector may be used to couple the hose to the valve body. The valve body may support the piercer.

The fire extinguisher may be arranged so that when the fire extinguisher is operated the handle/lever is depressed to cause the cartridge to be pierced by the piercer. After the cartridge is pierced by the cartridge piercer, the propellant may be released from the cartridge such that the fire suppressant stored in the cylinder is expelled from the cylinder. Specifically, once the cartridge has been pierced, the propellant may flow from the cartridge though the valve body into the cylinder. This may force the fire suppressant (e.g. powder or water) out of the cylinder, though the valve body, through the hose connector and into the hose, from where it can be directed at a fire. Thus, the fire suppressant may be expelled via the valve body, the hose connector, and the hose.

Fire suppressants used in cartridge-operated fire extinguishers may include dry powder, water, foam, or any other suitable fire suppressant.

An advantage of the valve body and/or cylinder design maybe improved stress distribution across the valve body and/or the cylinder, particularly when the fire extinguisher is in use. The improved stress distribution means that the plate thickness of the valve body and/or top of the cylinder may be reduced without compromising safety or structural integrity. This also enables the use of materials other than metals, such as a plastic (e.g. polyamide), for the valve body. A further advantage is that, unlike valve bodies of the prior art, the valve body itself may not be threaded. In other words, the valve body may be connected to the cylinder by a non-threaded connection. This means that there may be no likelihood of cross-threading when attaching the valve body to the cylinder of the fire extinguisher, thereby improving safety.

Another potential advantage is that fixing the valve body using bolts may mean that a single commonplace tool can be used to remove the valve body, which may simplify, speed up, and/or make fool-proof the inspection and maintenance process. A faster and simpler maintenance and inspection process may also reduce costs for operators.

The valve body may comprise and/or be made of a plastic material. The plastic may be polyamide.

An advantage of the valve body being plastic is that it may be cheaper, lighter, and more resistant to aggressive fire suppressant agents than metal valve bodies. Further, plastic may be more resistant to environmental damage and stresses due to temperature fluctuations.

Each of the first, second, and third apertures of the valve body may be a hole, slot or opening, or other suitable feature for receiving a bolt. The first aperture and the second aperture may be holes. The third aperture may be a slot. One or more of the first aperture, the second aperture, and the third aperture may be non-threaded. An advantage of the third aperture being a slot is that with an angled bolt on the cylinder, assembly of the valve body onto the cylinder may be facilitated.

The valve body may comprise a core and each of the first fixing point, the second fixing point, and the third fixing point may protrude radially outward from the core. That is, the core may be for interfacing with an opening in the cylinder of the fire extinguisher. One or more of the first fixing point, the second fixing point, and the third fixing point may be integrally formed with the core. The core may be circular in shape. The valve body may be a single piece component. The valve body may be injection moulded.

The first fixing point, the second fixing point, and the third fixing point may be equally spaced around the perimeter of the core of the valve body, e.g. spaced by 120°. An advantage of equally spacing the fixing points may be an improved stress distribution.

The valve body, e.g. a core of the valve body, may comprise an opening for a cartridge piercer mechanism and an opening for a hose connector. The opening for the cartridge piercer and the opening for the hose connector may be separate openings.

The valve body may comprise a support for a lever for dispensing fire suppressant.

As mentioned above, the valve body, e.g. the core of the valve body, may be for interfacing with an opening of a cylinder of a cartridge-operated fire extinguisher. When the valve body is mounted on the cylinder it may seal/close the opening.

The valve body, e.g. core of the valve body, may comprise an embossed portion (i.e. a raised portion) for interfacing with a perimeter of an opening of the cylinder. For example, the embossed portion may be circular and may have substantially the same diameter as that of the core itself. An advantage of the embossed portion is to provide an improved seal with the cylinder when the valve body is fixed to the cylinder, thereby improving safety.

The cylinder comprises three bolts for fixing the valve body to the cylinder. Whilst the cylinder may comprise more than three bolts, the cylinder may consist of three bolts (i.e. only have three bolts), for fixing the valve body to the cylinder. One or more of these bolts may additionally be used to fix other components, such as a hose connector, to the valve body and/or cylinder. For example, the third, angled bolt may be used to fix a hose connector to the cylinder. This may be in a location on top of the valve body. The valve body, e.g. upper surface of the core of the valve body, may comprise a support surface for a hose connector. The support surface may be closer to the third bolt than the first and second bolt. For example, the bolt with a shaft axis oriented at an angle relative to the first shaft axis and the second shaft axis may be used to also secure a hose connector to the valve body and hence the cylinder.

The first bolt may comprise a first shaft. The first shaft may comprise a first shaft axis. The second bolt may comprise a second shaft. The second shaft may comprise a second shaft axis. The third bolt may comprise a third shaft. The third shaft may comprise a third shaft axis. The first shaft axis and the second shaft axis may be parallel to one another, and may also be parallel to the longitudinal axis of the cylinder. The third shaft axis may be at an angle relative to the first shaft axis, and therefore at the same angle relative to the second shaft axis and the longitudinal axis.

As mentioned above, the shaft axis of the third bolt may be angled relative to the longitudinal axis of the cylinder. The third shaft axis may be at an angle of about 10° to 50°, e.g. at about 30° or 45°, relative to the longitudinal axis of the cylinder.

The valve body may fit in only one orientation on the cylinder. This may reduce errors during assembly of the fire extinguisher.

The valve body may include support for a cartridge piercer mechanism. As mentioned above, the cylinder of a cartridge-operated fire extinguisher may be used for housing fire suppressant and the cartridge. When the fire extinguisher is assembled, the cartridge may be attached to the valve body and suspended inside the cylinder through the opening of the cylinder. Before activation, the cylinder of the cartridge-operated fire extinguisher may be not pressurised. But, when the cartridge is activated and the lever/handle for releasing fire suppressant is activated, propellant in the cartridge may be released into the cylinder (e.g. via the vale body) and rapidly increase the pressure within the cylinder to propel the fire suppressant out of the cylinder and through the valve body, hose connector, and hose. Therefore, the cylinder may be designed to have a shape and strength capable of supporting all the usual features of a cartridge-operated fire extinguisher and withstanding high pressures in operation, i.e. after activation.

An advantage of the cylinder of the first aspect is that a valve body may be fixed to the cylinder without a threaded connection, meaning that a corresponding threaded portion of the opening of the cylinder is not required. The threaded portion of the opening of prior art cylinders are typically thick metal portions, so an advantage of removing the need for this feature may be a reduction in weight of the fire extinguisher. Further, the use of bolts for fixing a valve body to the cylinder has an advantage that a single commonplace tool, such as a wrench, may be used to secure and remove the valve body, which may simplify, speed up, and make fool-proof the inspection and maintenance process. A faster and simpler maintenance and inspection process may also reduce costs for operators.

The first, second, and third bolts may be designed, e.g. have the same diameter, so that the same type of nut can be used with each bolt. That is, the first shaft, the second shaft, and the third shaft may all have the same diameter. This may allow a single tool to be used to assemble and disassemble the fire extinguisher.

The opening of the cylinder may be at the top of the cylinder. The bolts may be spaced around the opening.

The first, second, and third bolts may be equally spaced around the perimeter of the opening so that the angular separation between each bolt is 120° relative to the centre of the opening, i.e. 120° around the opening. An advantage of the even separation of the bolts may be an improved stress distribution in the valve body and/or cylinder.

The cylinder may comprise a longitudinal axis, where the longitudinal axis extends in the longitudinal direction of the cylinder. The angular separation between the first bolt and the second bolt may be 120° around the longitudinal axis, the angular separation between the first bolt and the third bolt may be 120° around the longitudinal axis, and the angular separation between the second bolt and the third bolt may be 120° around the longitudinal axis.

One or more of the first bolt, the second bolt, and the third bolt may be spot welded to the cylinder.

According to a fourth aspect, the present invention provides a method of assembling the cartridge-operated fire extinguisher, the method comprising: mounting a valve body on the cylinder, wherein a first shaft of a first bolt of the cylinder passes through a first aperture of the valve body, a second shaft of a second bolt of the cylinder passes through the second aperture of the valve body, and a third shaft of a third bolt of the cylinder passes through a third aperture of the valve body, and securing the valve body to the cylinder.

The valve body may be the valve body of the first aspect (and may include one or more or all of the above described optional features of the valve body).

The cylinder may be the cylinder of the second aspect (and may include one or more or all of the above described optional features of the cylinder).

The fire extinguisher maybe the fire extinguisher of the third aspect (and may include one or more or all of the above described optional features of the fire extinguisher).

Each of the bolts may pass though each of the apertures simultaneously.

The valve body may be secured to the cylinder by screwing on nuts onto each of the bolts. Each nut may be the same type of nut.

The bolts and nuts may be the only means by which the valve body is secured to the cylinder.

DRAWING DESCRIPTION

Certain embodiments of the invention will now be described by way of example only and with reference to the accompanying drawings in which.

Figure 1:
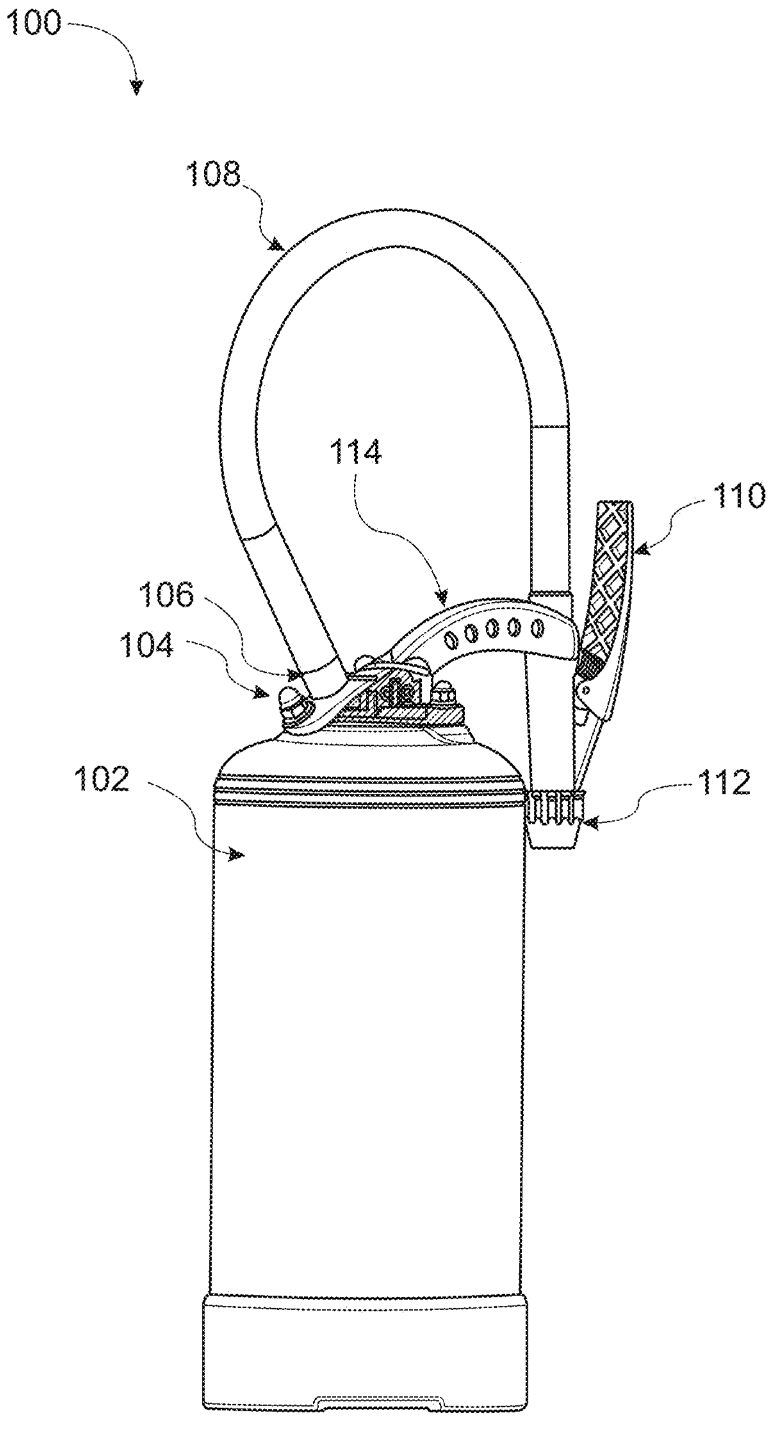
FIG. 1 illustrates a fire extinguisher.
Figure 4A:
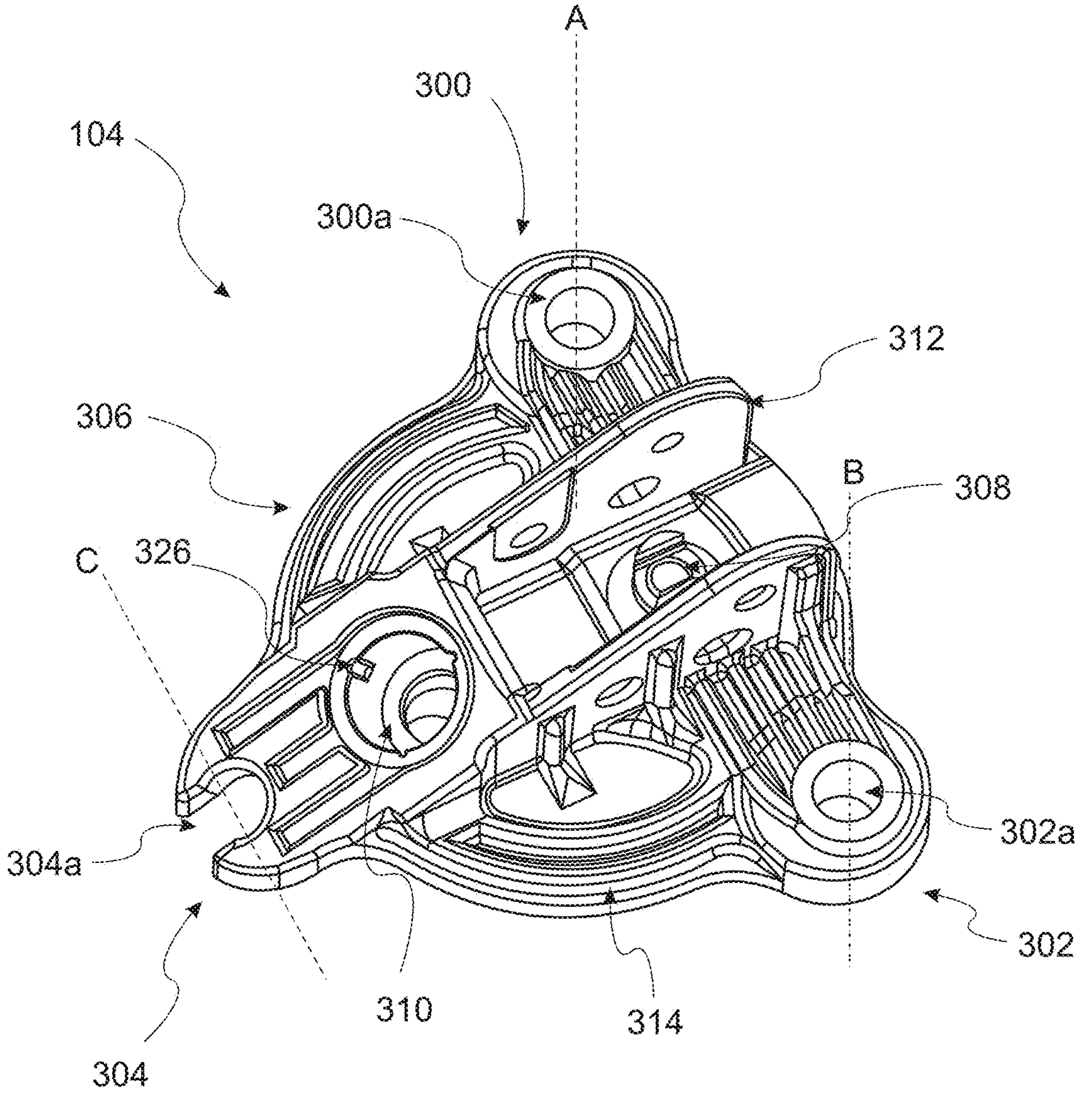
Figure 4B:
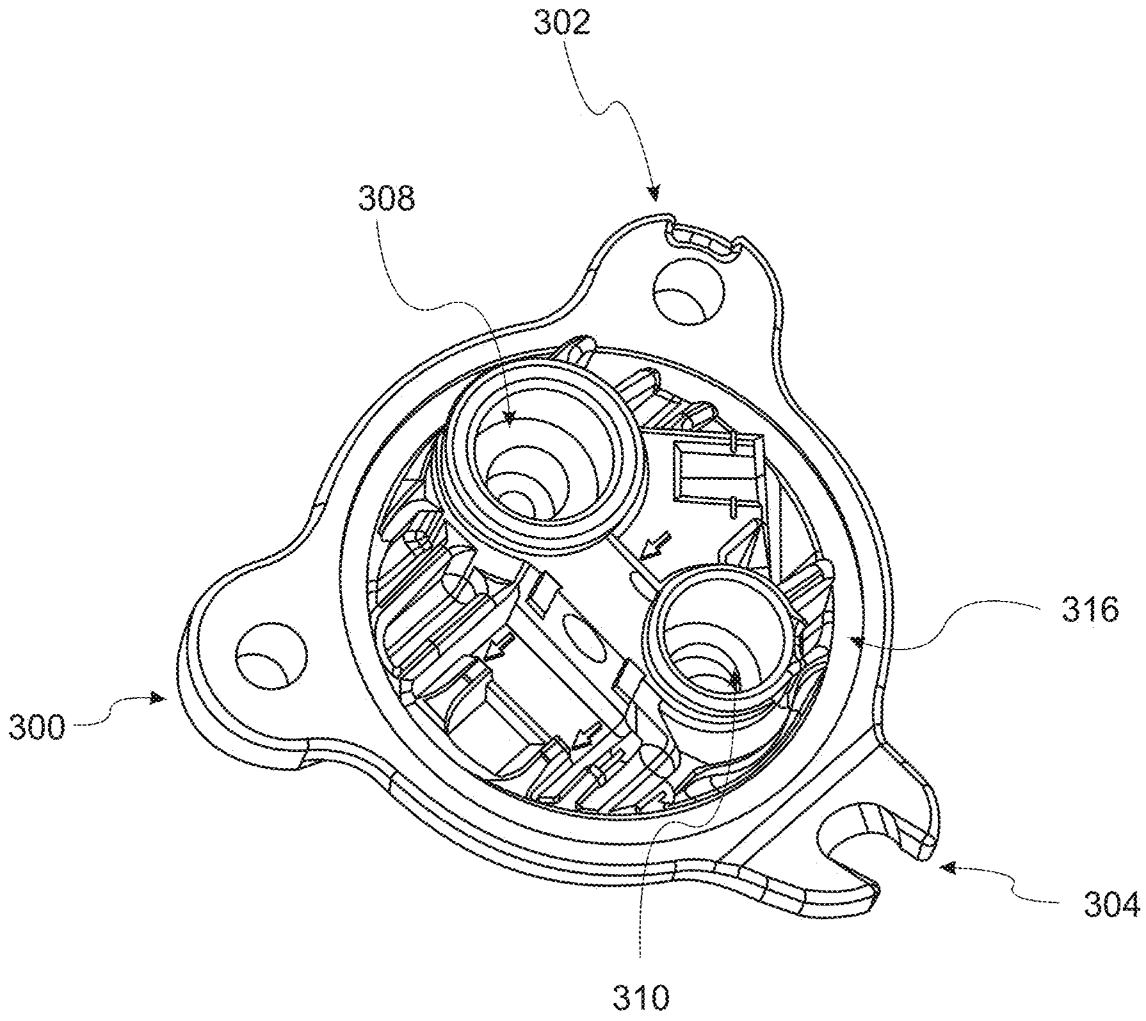
Figure 5A:
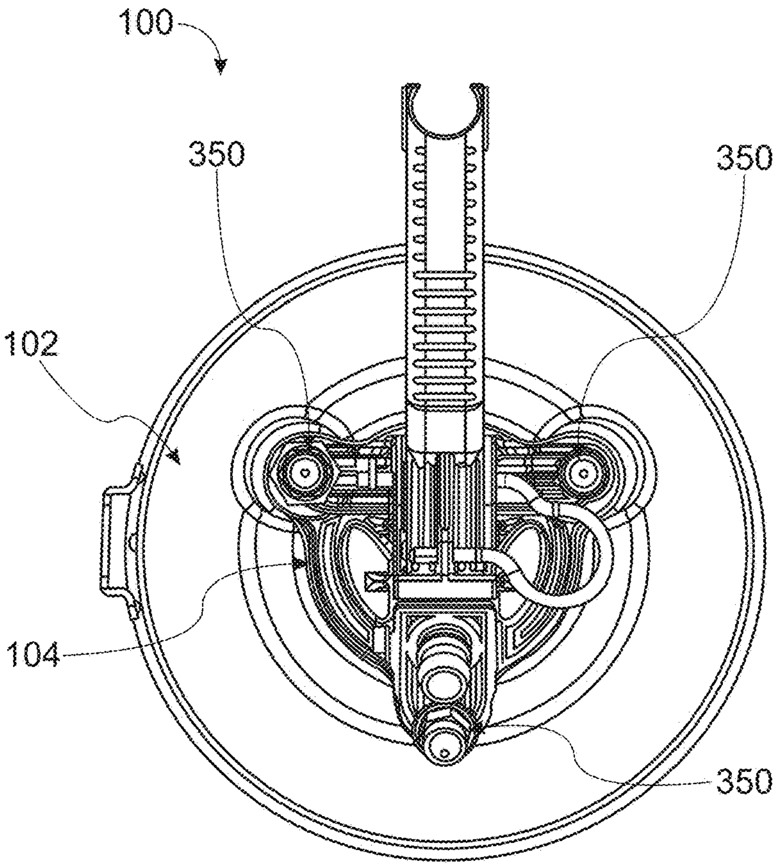
Figure 5B:
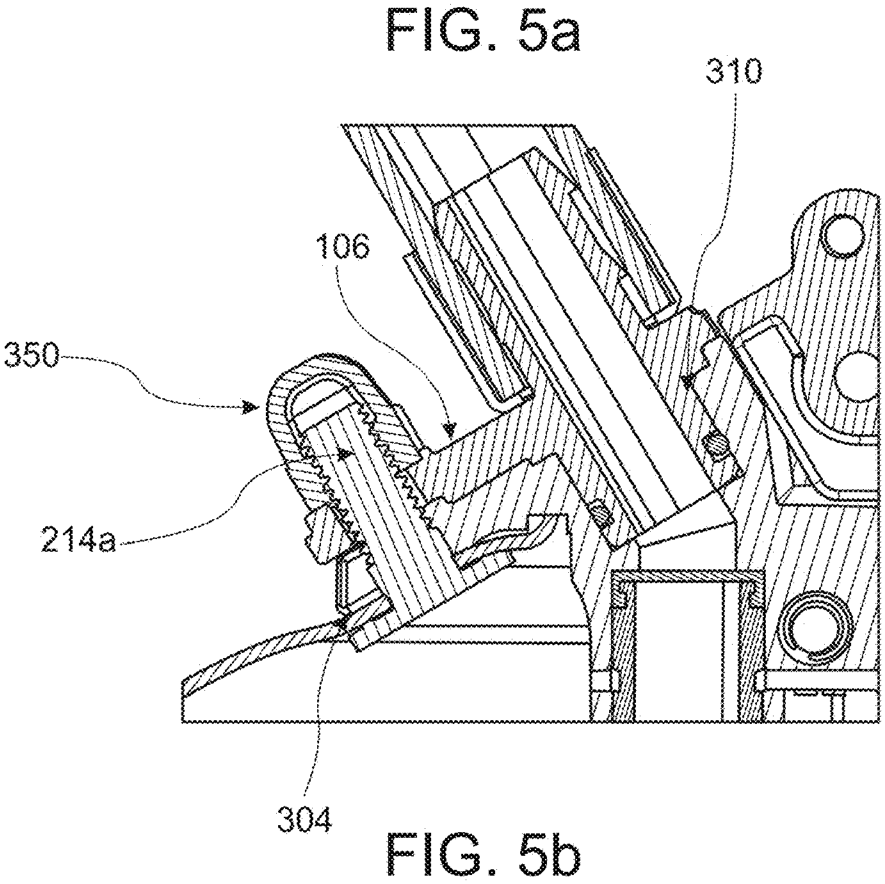

FIGS. 4*a* and 4*b* illustrate a valve body of the fire extinguisher of FIG. 1;

FIG. 5*a* is a top-down view of the fire extinguisher of FIG. 1 and FIG. 5*b* is a cross sectional view of a portion of the fire extinguisher of FIG. 1.

DETAILED DESCRIPTION

FIG. 1 shows a cartridge-operated fire extinguisher 100. The fire extinguisher comprises a cylinder 102, a valve body 104, a hose connector 106, and a hose 108. The valve body 104 is mounted on the top of the cylinder 102. The hose connector 106 is connected to the valve body 104, and the hose 108 is connected to the hose connector 106. In this way, the hose 108 is fluidly connected to an internal space within the cylinder 102.

The hose 108 comprises a handle 110 and a nozzle 112. A lever 114 is connected to the valve body 104. When the fire extinguisher 100 is not in use, the hose 108 may be mounted on to the lever 114 in a storage position.

Figure 2:
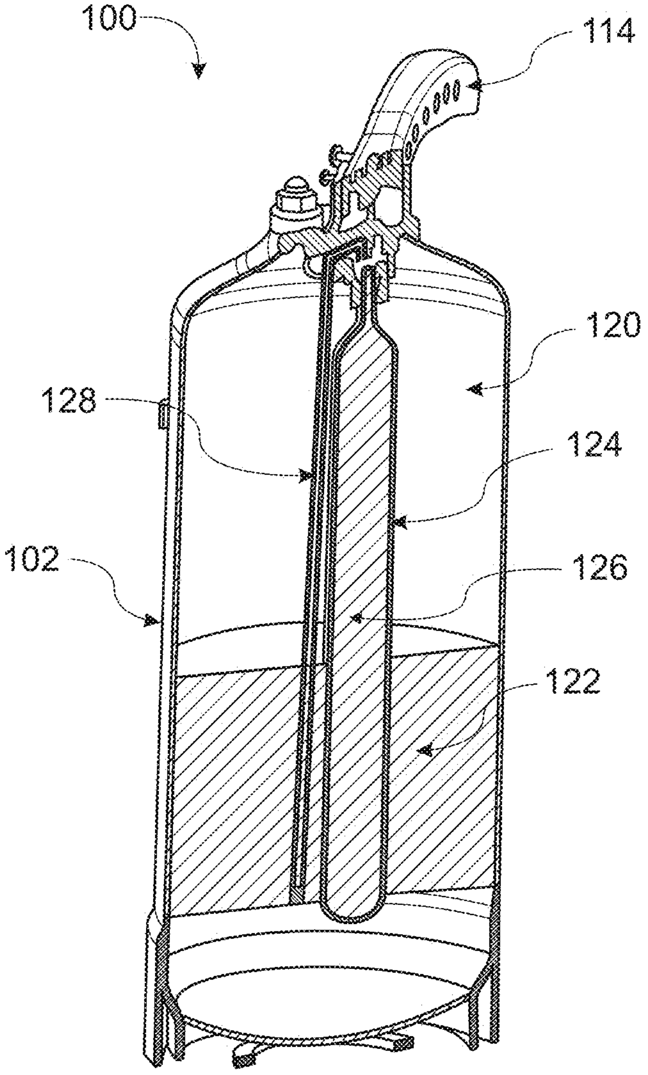
FIG. 2 illustrates a cross section of the fire extinguisher of FIG. 1.

FIG. 2 shows a cross-sectional image of the cartridge-operated fire extinguisher 100 of FIG. 1.

As mentioned above, the cylinder 102 comprises an internal space 120. The internal space comprises a fire suppressant 122. The fire suppressant 122 may be dry powder, water or any other suitable fire suppressant.

The internal space also comprises a cartridge 124, wherein the cartridge 124 is connected to the valve body 104. The cartridge 124 comprises a propellant 126 stored under pressure.

The valve body 104 houses a cartridge piercer. The cartridge piercer is configured to pierce the cartridge 124 when the lever 114 is operated by a user in order to activate the fire extinguisher 100. When the cartridge 124 is pierced, the propellant 126 is released through the valve body 104 into a blow tube 128 and then into the internal space 120 of the cylinder 102. The blow tube 128 is configured to direct the propellant 126 in a manner that forces the fire suppressant back out through the valve body 104, the hose connector 106, and through the hose 108. The nozzle 112 of the hose 108 may then be directed by a user towards a fire for extinguishing the fire and opened using handle 110.

Figure 3:
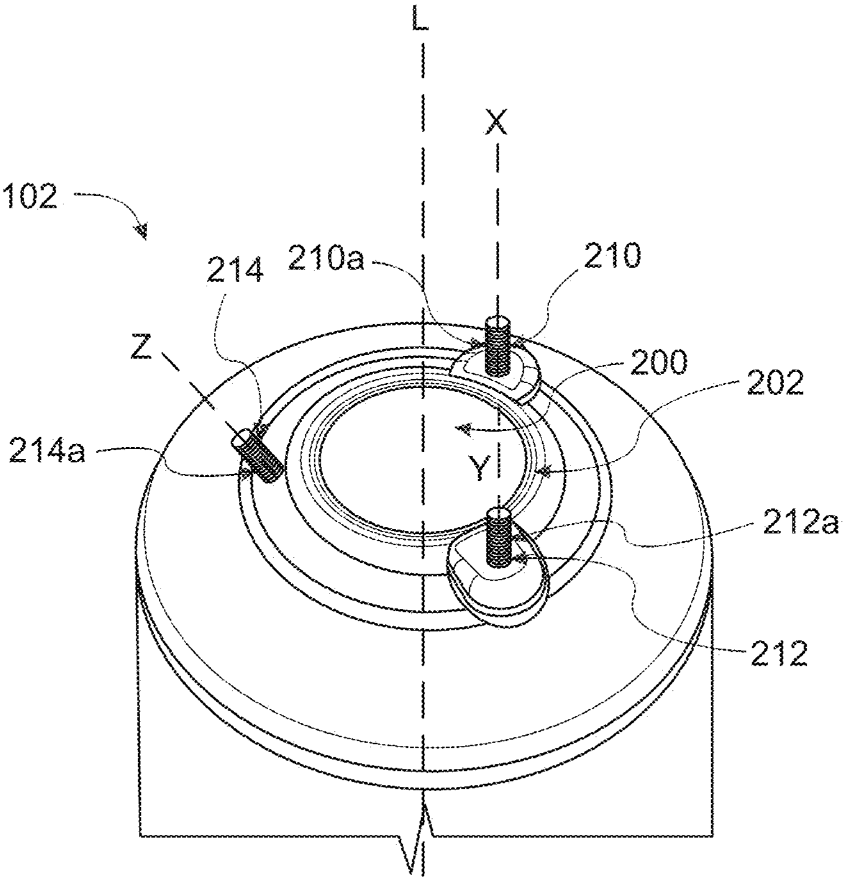
FIG. 3 illustrates a cylinder of the fire extinguisher of FIG. 1.

FIG. 3 illustrates a perspective view of the top part of the cylinder 102. The cylinder 102 comprises an opening 200 at the top of the cylinder 102, where the opening 200 is circular and the centre of the opening 200 is centred on a longitudinal axis L of the cylinder 102. The opening 200 has a perimeter 202. The top portion around the perimeter 202 of the opening 200 is raised upwards such that a raised portion is formed.

The cylinder 102 comprises a first bolt 210, a second bolt 212, and a third bolt 214. The bolts 210, 212, 214 are positioned on the top cylinder 102 and radially outside of the perimeter 202 of the opening 200. The first bolt 210 comprises a first shaft 210*a*. The first shaft 210*a* comprises a first shaft axis X. The second bolt 212 comprises a second shaft 212*a*. The second shaft 212*a* comprises a second shaft axis Y. The third bolt 214 comprises a third shaft 214*a*. The third shaft 214*a* comprises a third shaft axis Z.

The first shaft axis X and the second shaft axis Y are parallel to one another, and are also parallel to the longitudinal axis L of the cylinder 102. The third shaft axis Z is at an angle relative to the first shaft axis X, and therefore at the same angle relative to the second shaft axis Y and the longitudinal axis L. FIG. 3 depicts an arrangement in which the third shaft axis Z is at an angle of 30° relative to the longitudinal axis.

The bolts 210, 212, 214 are for fixing the valve body 104 to the cylinder 102. The bolts 210, 212, 214 in FIG. 3 are spot welded to the cylinder 102.

The bolts 210, 212, 214 have an equal angular distribution about the longitudinal axis L. That is, the angle between the positions of each bolt 210, 212, 214 around the longitudinal axis L is 120°. Further, the radial distance for each bolt 210, 212, 214 from the longitudinal axis L is the same.

FIGS. 4a and 4b show perspective views of the valve body 104. FIG. 4a shows a top side of the valve body 104, whereas FIG. 4b shows an underside of the valve body 104. The underside of the valve body 104 is mounted on and faces towards the cylinder 102 when the cartridge-operated fire extinguisher 100 is assembled.

The valve body 104 comprises a first fixing point 300, a second fixing point 302, and a third fixing point 304. The first fixing point 300 comprises a first aperture 300a. The first aperture 300a comprises a first fixing point axis A centred through the first aperture 300a. The second fixing point 302 comprises a second aperture 302a. The second aperture comprises a second fixing point axis B centred through the second aperture 302a. The third fixing point 304 comprises a third aperture 304a. The third aperture 304a comprises a third fixing point axis C centred through the third aperture 304a.

The valve body comprises a core 306. The core 306 is circular in shape, i.e. it has a circular cross section. The fixing points 300, 302, 304 protrude radially from the core 306. The core 306 is for interfacing with the opening 200 of the cylinder 102. The fixing points 300, 302, 304 are integrally formed with the core 306. That is, the valve body 104 shown in FIGS. 4a and 4b is a single-piece component.

The first fixing point axis A and the second fixing point axis B are parallel. The third fixing point axis C is oriented at an angle relative to the first fixing point axis A, and therefore at the same angle relative to the second fixing point axis B. In this case, the third fixing point axis C is at an angle of 30° relative to the first and second fixing point axes A, B.

The first aperture 300a is for receiving the first shaft 210a of the first bolt 210 of the cylinder 102. The second aperture 302a is for receiving the second shaft 212a of the second bolt 212. The third aperture 304a is for receiving the third shaft 214a of the third bolt 214. The first aperture 300a and the second aperture 302a are through-holes in the first and second fixing points 300, 302, respectively. The third aperture 304a is a slot in the third fixing point 304.

The fixing points 300, 302, 304 are equally spaced around a perimeter of the core 306 of the valve body 104. That is, the fixing points 300, 302, 304 are positioned such that the fixing point axes A, B, C have an angle of 120° about an equidistant point between each axis.

The valve body 104 comprises a cartridge piercer opening 308 and a hose connector receiving hole 310. The cartridge piercer opening 308 and the hose connector receiving hole 310 are separate openings. The cartridge piercer opening 308 comprises an axis that is parallel to the first fixing point axis A and the second fixing point axis B. The hose connector receiving hole 310 comprises an axis that is parallel to the third fixing point axis C. The hose connector receiving hole 310 shown in FIG. 4a comprises three grooves 326 on its inner surface.

The valve body 104 comprises a support 312 for the lever 114. The support 312 is positioned between the first fixing point and the second fixing point 302.

As shown in FIG. 4a, the top side of the core 306 comprises reinforcing ribs 314. The reinforcing ribs 314 are protrusions from the valve body 104 and are positioned along several locations such that they reinforce portions of the valve body 104 that experience high stresses when the cartridge-operated fire extinguisher 100 is in use. In the valve body 104 of FIG. 4a, reinforcing ribs 314 are positioned proximate to the perimeter of the core 306 between the first fixing point 300 and the third fixing point 304, proximate to the perimeter of the core 306 between the second fixing point 302 and the third fixing point 304, between the first fixing point 300 and the support 312, and between the second fixing point 302 and the support 312.

As shown in FIG. 4b, the underside of the core 306 of the valve body 104 comprises an embossed portion 316. The embossed portion 316 is circular and is proximate to the perimeter of the core 306. The embossed portion 316 is for interfacing with the raised portion of the perimeter 202 of the opening 200 of the cylinder 102.

FIG. 5a is a top-down view of the cartridge-operated fire extinguisher 100 of FIG. 1. In this Figure, the valve body 104 is secured to the cylinder 102. To secure the valve body 104 to the cylinder 102, the valve body 104 is first mounted to the cylinder 102. In doing so, the valve body 102 covers the entirety of the opening 200 of the cylinder 102. The valve body 104 and the perimeter 202 of the opening 200 are configured such that, when the valve body 104 is mounted to the cylinder 102, a seal is formed between the valve body 104 and the cylinder 102.

To mount the valve body 104, the first shaft 210a of the first bolt 210 of the cylinder 102 passes through the first aperture 300a of the first fixing point 300 of the valve body 104. Likewise, the second shaft 212a of the second bolt 212 of the cylinder 102 passes through the second aperture 302a of the second fixing point 302 of the valve body 104, and the third shaft 214a of the third bolt 214 of the cylinder 102 passes through the third aperture 304a of the third fixing point 304 of the valve body 104. As the valve body 104 is mounted on the cylinder 102 each of the bolts 210, 212, 214 may pass through each respective aperture 300a, 302a, 304a simultaneously.

Then, the valve body 104 is secured to the cylinder 102. The valve body 104 in FIGS. 5a and 5b is secured to the cylinder by the use of three nuts 350, one on each of the bolts 210, 212, 214.

In FIG. 5b, the hose connector 106 is secured to the valve body 104 by one of the nuts 350 on the third bolt 214. That is, the third shaft 214 passes through the third aperture 304a and an aperture of the hose connector 106. The hose connector 106 is received in the hose connector opening 310 of the valve body 104.

What is claimed is:

1. A valve body (104) for a cartridge-operated fire extinguisher, the valve body comprising:

a first fixing point (300) comprising a first aperture (300a) for receiving a first shaft of a first bolt, wherein the first aperture has a first fixing point axis (A);

a second fixing point (302) comprising a second aperture (302a) for receiving a second shaft of a second bolt, wherein the second aperture has a second fixing point axis (B); and a third fixing point (304) comprising a third aperture (304a) for receiving a third shaft of a third bolt, wherein the third aperture has a third fixing point axis (C), wherein the first fixing point axis (A) and the second fixing point axis (B) are parallel, and wherein the third fixing point axis (C) is oriented at an angle relative to the first fixing point axis (A) and the second fixing point axis (B);

wherein the third fixing point axis (C) is oriented at an angle of between 10° to 50° relative to the first fixing point axis (A) and the second fixing point wherein the valve body (104) comprises a core (306), and wherein the first fixing point (300), second fixing point (302), and third fixing point (304) each protrude radially outward from the core (306); and wherein the first fixing point (300), second fixing point (302), and third fixing point (304) are equally spaced from one another around a perimeter of the core (306).

2. The valve body of claim 1, wherein the first aperture (300*a*), the second aperture (302*a*), and the third aperture (304*a*) are non-threaded.

3. The valve body according to claim 1, wherein the valve body (104) is made of plastic.

4. The valve body according to claim 1, wherein the first aperture (300*a*) is a hole, the second aperture (302*a*) is a hole, and the third aperture (304*a*) is a slot.

5. The valve body of claim 1, wherein the first fixing point (300), second fixing point (302), and third fixing point (304) are each integrally formed with the core (306).

6. The valve body of claim 1, wherein the core (306) comprises an embossed portion for interfacing with a cylinder of the cartridge-operated fire extinguisher.

7. A cartridge-operated fire extinguisher (100) comprising the valve body (104) according to claim 1.

8. A method of assembling the cartridge-operated fire extinguisher (100) according to claim 7, the method comprising:

mounting the valve body (104) on the cylinder (102), wherein the first shaft(210*a*) of the first bolt (210) of the cylinder passes through the first aperture (300*a*) of the valve body, the second shaft (212*a*) of the second bolt (212) of the cylinder (102) passes through the second aperture (302*a*) of the valve body, and the third shaft (214*a*) of the third bolt (214) of the cylinder passes through the third aperture (304*a*) of the valve body, and securing the valve body (104) to the cylinder (102).

9. The method according to claim 8, wherein the valve body (104) is secured to the cylinder (102) using nuts (350).

10. The cartridge-operated fire extinguisher (100) of claim 7, comprising a cylinder, wherein the cylinder comprises:

the first bolt (210) having the first shaft (210*a*), wherein the first shaft comprises a first shaft axis (X);

the second bolt (212) having the second shaft (212*a*), wherein the second shaft comprises a second shaft axis (Y); and the third bolt (214) having the third shaft (214*a*), wherein the third shaft comprises a third shaft axis (Z), wherein the first bolt, the second bolt, and the third bolt are for fixing the valve body (104) to the cylinder, wherein the first shaft axis (X) and the second shaft axis (Y) are parallel, and wherein the third shaft axis (Z) is oriented at an angle relative to the first shaft axis (X) and the second shaft axis (Y).

11. The cartridge-operated fire extinguisher (100) of claim 10, wherein the first shaft (210*a*), the second shaft (212*a*), and the third shaft (214*a*) all have a same diameter.

12. The cartridge-operated fire extinguisher (100) of claim 10, wherein the cylinder (102) has a longitudinal axis (L), and wherein an angular separation between the first bolt (210) and the second bolt (212) is 120° around the longitudinal axis, an angular separation between the first bolt (210) and the third bolt (214) is 120° around the longitudinal axis, and an angular separation between the second bolt (212) and the third bolt (214) is 120° around the longitudinal axis.

13. The cartridge-operated fire extinguisher (100) of claim 10, wherein the first bolt, the second bolt, and the third bolt (210, 212, 214) are welded to the cylinder (102).

* * * * *